H. EVANS.
SHOCK ABSORBER.
APPLICATION FILED FEB. 10, 1914.
1,119,005.
Patented Dec. 1, 1914.
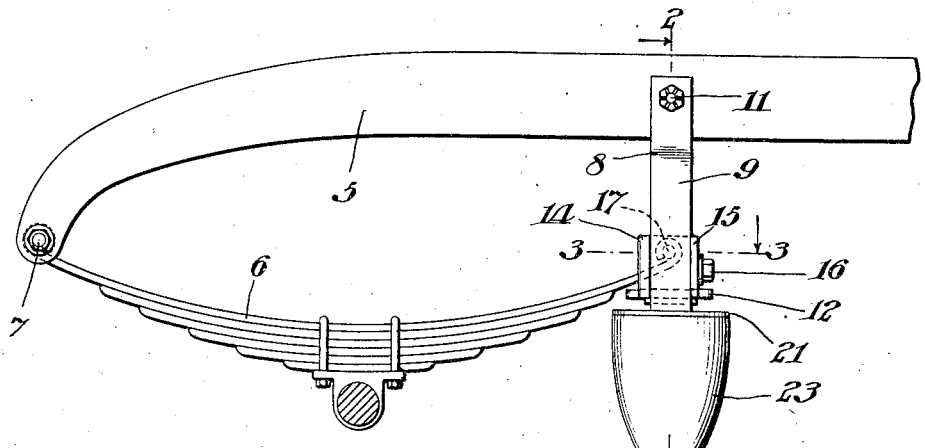
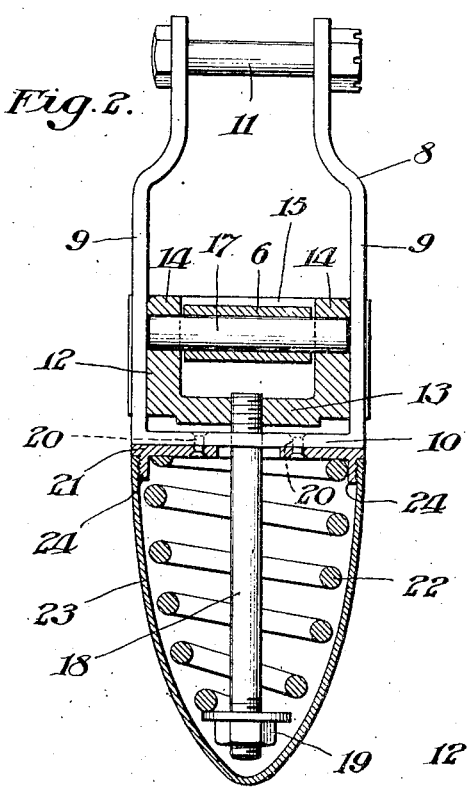
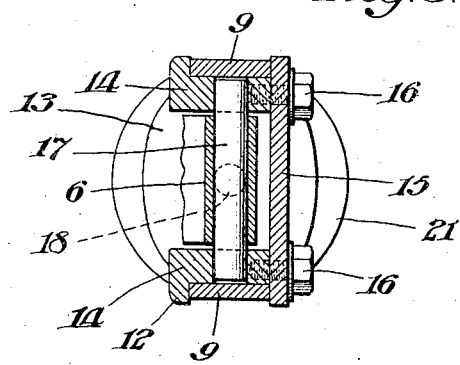
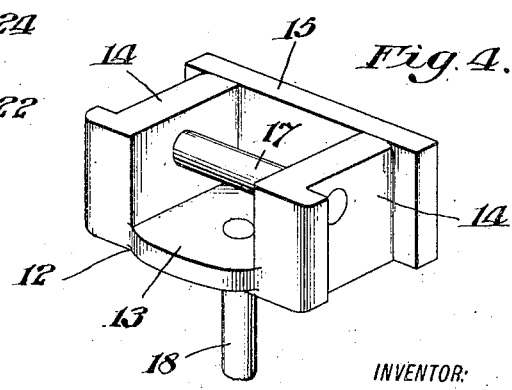
WITNESSES:
R. Schleicher
P. V. Sharkey
INVENTOR:
Harry Evans,
BY
A. V. Jones
ATTORNEY.

UNITED STATES PATENT OFFICE.

HARRY EVANS, OF BRYN MAWR, PENNSYLVANIA.

SHOCK-ABSORBER.

1,119,005.  Specification of Letters Patent.  Patented Dec. 1, 1914.

Application filed February 10, 1914. Serial No. 817,740.

*To all whom it may concern:*

Be it known that I, HARRY EVANS, a citizen of the United States, residing at Bryn Mawr, in the county of Montgomery and State of Pennsylvania, have invented certain new and useful Improvements in Shock-Absorbers, of which the following is a specification.

The object of my invention is to provide a novel, simple and efficient shock absorber for vehicles, particularly motor vehicles having spring supported bodies; and to this end my invented device consists of the elements and the combinations of them hereinafter fully described and particularly claimed.

In the accompanying drawings, illustrating my invention Figure 1, is a side elevation of a portion of one of the side bars of the frame of a motor vehicle and one of its supporting springs having my improved shock absorber applied thereto. Fig. 2, is a vertical section, on line 2—2 of Fig. 1. Fig. 3, is a horizontal section, on line 3—3 of Fig. 1. Fig. 4, is a perspective view of the slidable block.

Referring to the drawings, 5 designates the forward end portion of one of the side bars of the frame of an automobile and 6 one of the forward supporting springs therefor. The forward end of the spring 6 is pivoted, at 7, to the forward end of the bar 5 and the rearward end of the spring 6 is connected to the bar 5 by means of my improved shock absorber which is constructed and connected as follows:

8 designates a bracket formed of a strip of metal bent to form two parallel side members 9 and a bottom member 10. The upper ends of the side members 9 are inset to fit the sides of the bar 5 and are pivoted thereto by means of a bolt 11. Extending between the side members 9 is a vertically slidable block 12 comprising a bottom wall 13, spaced side walls 14 rising from the bottom wall 13 and a removable plate 15 secured to the side walls 14 by means of screws 16 extending through holes in the plate 15 and entering the side walls 14. The side walls 14 and plate 15 embrace the side members 9 and form guideways through which the side members slide when the block 12 moves vertically. The rearward end of the supporting spring 6 extends into the space between the walls 14 of the block 12 and is pivoted thereto by means of a pin 17 the ends of which extend into openings in the walls.

The outer ends of the openings into which the pin 17 extends are closed by the side members 9 which thus serve to prevent endwise displacement of the pin.

Screwed into or otherwise secured to the bottom wall 13 of the block 12 is the upper end of a rod 18 which extends downwardly through an opening in the bottom member 10 of the bracket 8 and has a nut or head 19 screwed on to the lower end thereof. Surrounding the rod 18 and secured to the bottom of the member 10 by means of rivets 20 is a head 21. Encircling the rod 18 between and engaging the heads 19 and 21 is a spring 22 which is adapted to oppose upward movement of the block 12. The spring 22 and lower portion of the rod 18 and the parts carried thereby are entirely inclosed and protected by a guard 23, the upper end of which is screwed on to an annular flange 24 projecting downwardly from the head 21. The flange 24 also serves to center the upper end of the spring 22 and hold it in place.

From the construction hereinbefore described, it will be readily understood that the block 12 will slide vertically between the side members 9 of the bracket 8 to permit the spring 22 to absorb the shock usually given to the parts of the automobile as it passes over ruts or obstructions in the road.

I claim:

1. In a shock absorber, the combination with a vehicle frame and a supporting spring therefor, of a bracket comprising two parallel side members connected at their bottoms, said side members being pivoted at their upper ends to said frame, a block mounted to slide vertically in said bracket between said side members and comprising a bottom wall, spaced side walls rising from the bottom wall and a removable plate secured to the side walls, said end walls and said plate embracing said side members and forming guideways, a pin carried by said block and extending across the space between said side walls and having said supporting spring connected thereto, a rod connected to said bottom wall and extending downwardly therefrom through the bottom of said bracket and having a head on the lower end thereof, and a spring encircling said rod between said bracket and said head and arranged to oppose upward movement of said block.

2. In a shock absorber, the combination with a vehicle frame and a supporting spring therefor, of a bracket comprising two parallel side members connected at their bottoms, said side members being pivoted at their upper ends to said frame, a block mounted to slide vertically in said bracket between said side members and comprising a bottom wall, spaced side walls rising from the bottom wall and a removable plate secured to the side walls, said end walls and said plate embracing said side members and forming guideways, a pin extending into openings in said side walls and across the space therebetween and having said supporting spring connected thereto, endwise displacement of said pin being prevented by said side members, a rod connected to said bottom wall and extending downwardly therefrom through the bottom of said bracket and having a head on the lower end thereof, and a spring encircling said rod between said bracket and said head and arranged to oppose upward movement of said block.

3. In a shock absorber, the combination with a vehicle frame and a supporting spring therefor, a bracket formed of a strip of metal bent to form a bottom member and two parallel side members, said side members being pivoted at their upper ends to said frame, a block mounted to slide vertically in said bracket and connected to said supporting spring, a rod connected to the block and extending downwardly therefrom through the bottom member of the bracket and having a head on the lower end thereof, a head surrounding said rod and secured to the bottom of said bottom member, and a spring encircling said rod between said heads and arranged to oppose upward movement of said block.

4. In a shock absorber, the combination with a vehicle frame and a supporting spring therefor, a bracket formed of a strip of metal bent to form a bottom member and two parallel side members, said side members being pivoted at their upper ends to said frame, a block mounted to slide vertically in said bracket and connected to said supporting spring, a rod connected to the block and extending downwardly therefrom through the bottom member of the bracket and having a head on the lower end thereof, a head surrounding said rod and secured to the bottom of said bottom member, a spring encircling said rod between said heads and arranged to oppose upward movement of said block, and a guard secured to the second named head and inclosing said spring and rod.

In testimony whereof I affix my signature in presence of two witnesses.

HARRY EVANS.

Witnesses:
S. I. HARPER,
A. V. GROUPE.